United States Patent [19]

Kimura

[11] Patent Number: 4,945,385
[45] Date of Patent: Jul. 31, 1990

[54] IMAGE FORMING APPARATUS

[75] Inventor: Akiyoshi Kimura, Tokyo, Japan

[73] Assignee: Canon Kabushiki Kaisha, Tokyo, Japan

[21] Appl. No.: 241,863

[22] Filed: Sep. 8, 1988

[30] Foreign Application Priority Data

Sep. 11, 1987 [JP] Japan ................................ 62-227667

[51] Int. Cl.$^5$ ............................................. G03G 15/00
[52] U.S. Cl. ...................................... 355/202; 355/210; 346/160
[58] Field of Search ............... 355/232, 228, 210, 202; 346/160

[56] References Cited

U.S. PATENT DOCUMENTS 3,936,179  2/1976  Murakami ........................... 355/232

Primary Examiner—R. L. Moses
Attorney, Agent, or Firm—Fitzpatrick, Cella, Harper & Scinto

[57] ABSTRACT

An image forming apparatus includes a photosensitive member, first optical system for illuminating an original and exposing the photosensitive member to light from the original, the first optical system including a lens unit having a lens for forming an image of the original on the photosensitive member, and a second optical system for projecting light on the photosensitive member, wherein the lens unit and the second optical systems are fixed on the same base member.

18 Claims, 6 Drawing Sheets

IMAGE FORMING APPARATUS

FIELD OF THE INVENTION AND RELATED ART

The present invention relates to an image forming apparatus wherein an image corresponding to an original is formed on a photosensitive member, more particularly to an image forming apparatus which comprises means for exposing the photosensitive member in addition to optical means for exposing the photosensitive member to the light reflected by the original.

An image forming apparatus wherein an image corresponding to an original image is formed on a photosensitive member is widely used. Recently, such an apparatus is equipped with means for performing additional function or functions such as masking and/or trimming operation. Such a multi-function apparatus is generally provided with an illumination source such as an array of LED elements for controlling exposure area on the photosensitive member in addition to a light source for illumination the original. The additional light source is effective to control the exposure area to perform the trimming operation. Recently, it has been proposed that a laser scanning unit is used as this additional light source to provide a high resolution image with better additional function (U.S. Ser. No. 880523).

Referring first to FIG. 6, an example of such an apparatus having the laser scanning unit will be described. FIG. 6 is a sectional view of the apparatus.

The apparatus comprises a photosensitive drum 100, around which there are provided a charger 101, developing devices 102A and 102B, a transfer charger 103, a separation discharger 104, a cleaner 105 and other means.

As for an optical device for exposing the photosensitive drum 100 to an image, the apparatus comprises a first optical system 110 and a second optical system 120. The first optical system 110 includes a lamp 112 for illuminating an original placed on the original carriage 111, mirrors 113, 114 and 115, an imaging lens 116 and mirrors 117, 118 and 119. The light reflected by the original is projected onto the photosensitive drum 100. The second optical system 120 scans the photosensitive drum 100 with a laser beam by a rotational mirror to expose it to an image. The first optical system 110 is securedly fixed on a casing 130, whereas the second optical system 120 is securedly mounted on a mounting base 131 which is exclusively for the second optical system.

Since in this apparatus, the casing 130 for fixing the lens 110 which is influential to the imaging on the photosensitive drum 100 and the mounting base 131 for mounting the second optical system 120, are separate, the accuracy in the relative positional relationship between the imaging lens and the second optical system is relatively poor to such an extent that the images exposed by the first and second optical systems are separately inclined relative to the generating line of the photosensitive drum 100. When, for example, a superimposed image is formed, the quality of the image is degraded by deviations between the images. Also, since the first and second optical systems 110 and 120 are provided with separate and respective supporting bases, the apparatus becomes bulky and heavy.

SUMMARY OF THE INVENTION

Accordingly, it is a principal object of the present invention to provide an image forming apparatus wherein the relative positional relation is high between the imaging light from the original and additional exposure light from an additional photosensitive member exposing light source which is separated from the light source for illuminating the original.

It is another object of the present invention to provide an image forming apparatus wherein the number of the members required for fixing the optical members is reduced.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
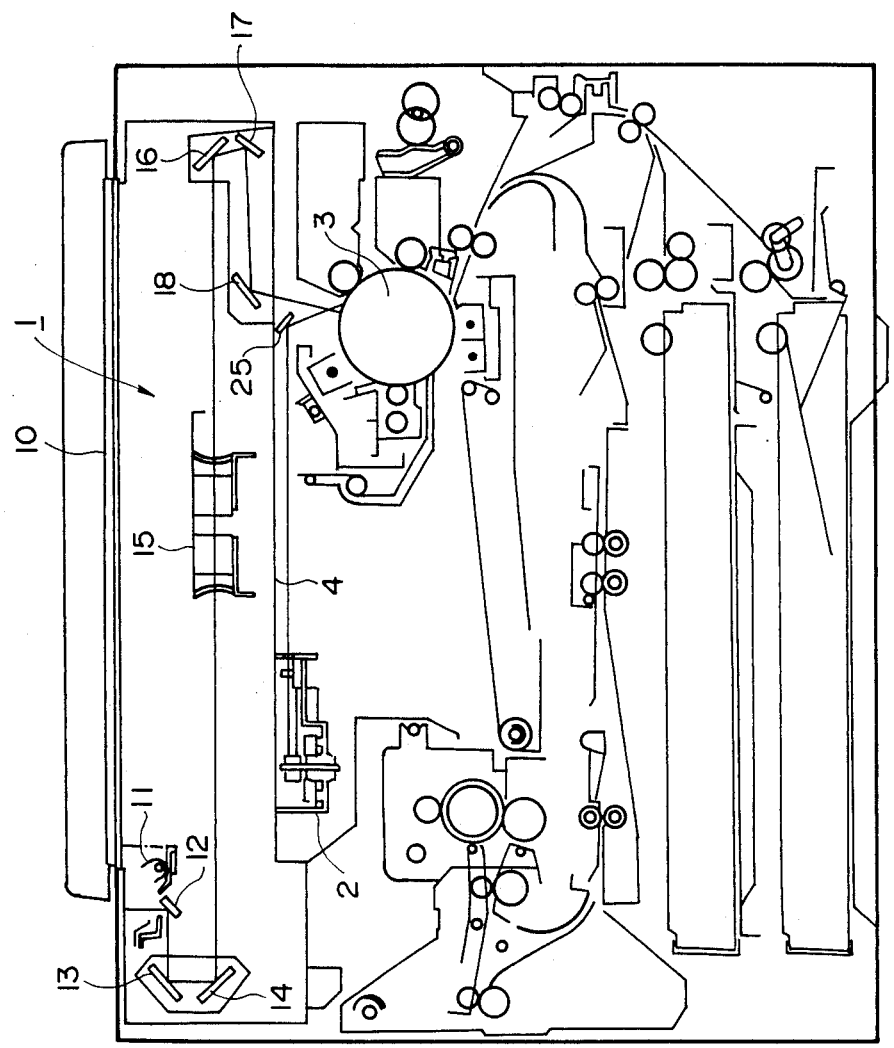
FIG. 1 is a sectional view of an image forming apparatus according to an embodiment of the present invention.

Referring to FIG. 1, there is shown an apparatus according to an embodiment of the present invention.

The apparatus comprises a first optical system for exposing a photosensitive drum 3 to light reflected from an original 1, and a second optical unit for removing unnecessary electric charge from the photosensitive drum 2, the second optical unit being controllable by an electric signal in the illumination area.

The first optical system 1 includes a lamp 11 for illuminating an original placed on an original supporting platen 10, mirrors 12, 13 and 14, a lens 15 for imaging an original on the surface of the photosensitive drum 3 and mirrors 16, 17 and 18. The light reflected by the original 1 is directed onto the photosensitive drum 3 by way of the mirrors 12, 13 and 14, through the lens 15 and by way of the mirrors 16, 17 and 18.

Figure 4:
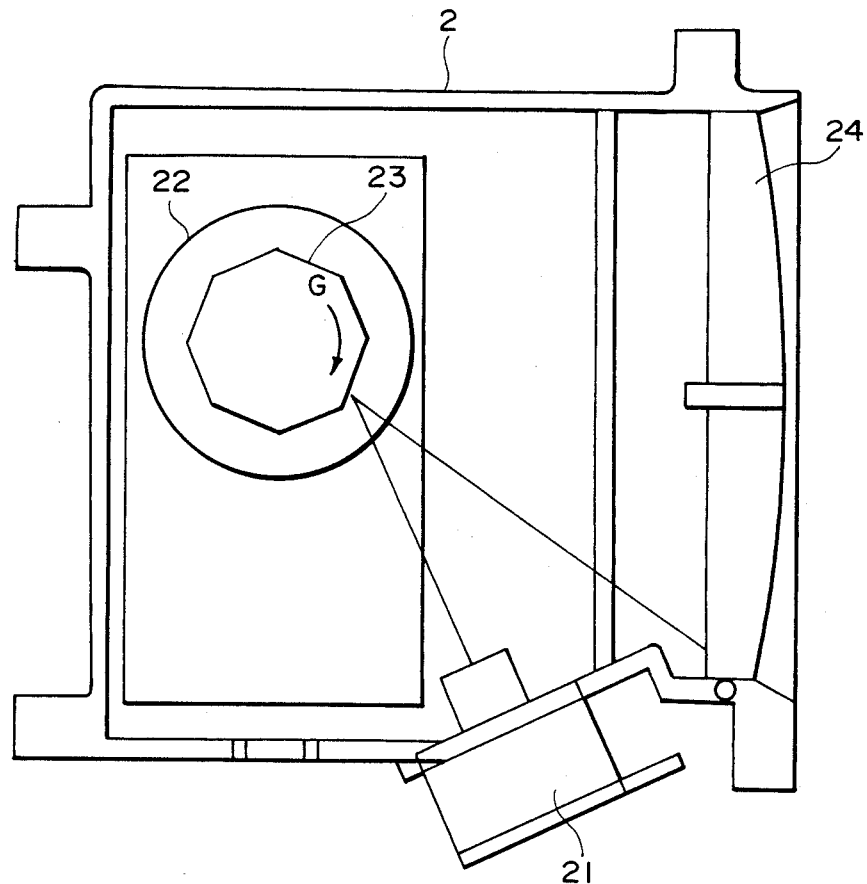
FIG. 4 is a laser scanner unit of FIG. 1 embodiment.

As shown in FIG. 4, the second optical system, that is, the optical unit 2 includes a laser generator 21 containing therein a semiconductor laser, a motor 22, a polygonal mirror 23 directly connected to the motor 22 and rotatable in a direction indicated by an arrow G, and a toric lens (f-$\theta$ lens) 24. The laser beam generated and emitted from the laser generator 21 is deflected by the polygonal mirror 23 and is directed onto the photosensitive drum 3 through the f-$\theta$ lens 24.

The description will be made as to the structure and the operation of the laser scanner unit which is the second optical system. Firstly, the unit 2 may be used as a latent image forming means by connecting it to an output apparatus such as a computer, a wordprocessor or the like, and a combined image is formed with the image formed by the first optical system 1. Secondary, it is usable as a means for forming a blank at a leading portion of the image to assist separation of the transfer sheet from the photosensitive drum 3 or a means for dissipating unnecessary electric charge in the region of the photosensitive drum 3 corresponding to the interval between a transfer sheet and a next transfer sheet. Thirdly, it is usable as a means for masking or trimming by erasing an unnecessary part of the image formed by the first optical system 1 by using in combination with coordinate input means such as a digitizer. Fourthly, a part of the optical path of the first optical system is blocked, and information not included in the original image, such as a date or pages are added in the blocked portion, to perform an add-on function.

In any of the above described functions to be performed, the main scanning direction of the scanning means by the laser scanner unit 2 is required to be parallel with the generating line of the photosensitive drum 3 with precision. Additionally, when the trimming or masking and/or add-on functions are incorporated to control the analog exposure by the first optical system 1, the scanning beam is required to be highly parallel relative to the incident beam from the first optical system 1 in addition to the generating line of the photosensitive drum 3.

Figure 2:
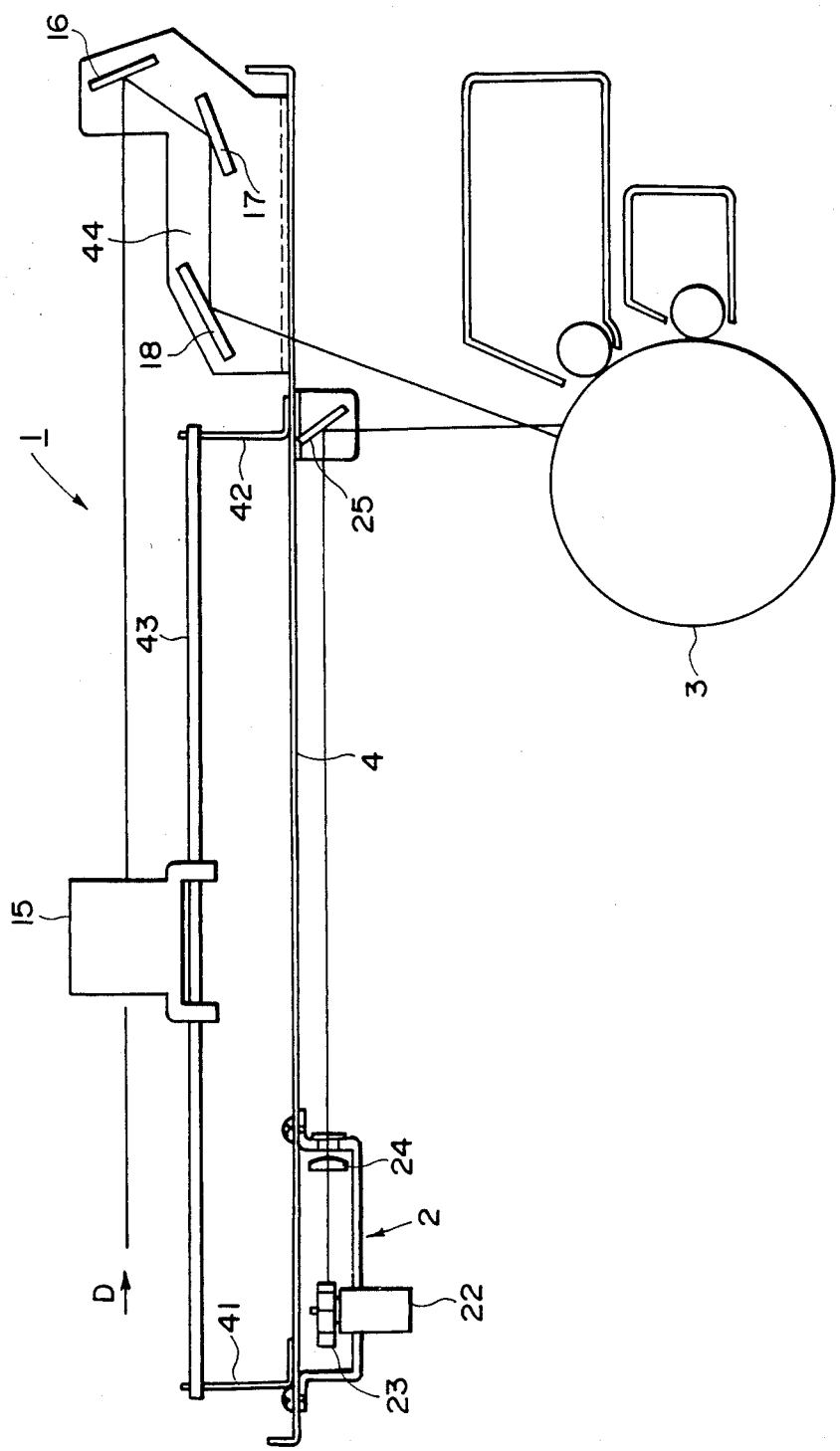
FIG. 2 is a sectional view of a major part of a supporting portion of the optical system in the embodiment shown in FIG. 1.

As shown in FIG. 2, to accomplish those, a lens unit having a lens 15 influential to the imaging on the photosensitive drum 3 by the first optical system and the scanner unit 2 (the second optical system) are both fixed to one and the same supporting plate 4 in this embodiment.

The lens unit includes a lens 15, a rail 43 for slidably supporting the lens 15 and rail mounts 41 and 42 for supporting the rail 43. The lens 15 is a zoom lens, and the magnification of the image of the original formed on the photosensitive drum 3 is changed by changing the position along the rail 43.

In this embodiment, the mirrors 16, 17 and 18 and a mirror unit including the mirror supporting plates 44 at the opposite ends of the mirrors, are securely fixed on the supporting plate 4. The mirror supporting plates of the mirror unit are vertically supported on the supporting plate 4 at the opposite ends thereof.

In the positional adjustment between the lens 5 and the mirrors 16, 17 and 18 at the time of setting the supporting plate 4 in the main assembly of the apparatus, a reference beam D is used, more particularly, the reference beam D is projected onto the photosensitive drum 3 through the lens at a predetermined position, and the illumination position is made parallel with respect to the generating line of the photosensitive drum 3 by adjusting the position of one or more of the mirrors 16, 17 and 18. Therefore, if the supporting plate 4 is positioned relative to the main assembly of the apparatus with high positional precision, the adjustment of the optical system in the main assembly is eased. The supporting plate 4 is formed of a rigid steel plate having a thickness not less than 1.6 mm to minimize influence of a vibration from a driving station provided in the main assembly.

Figure 3:
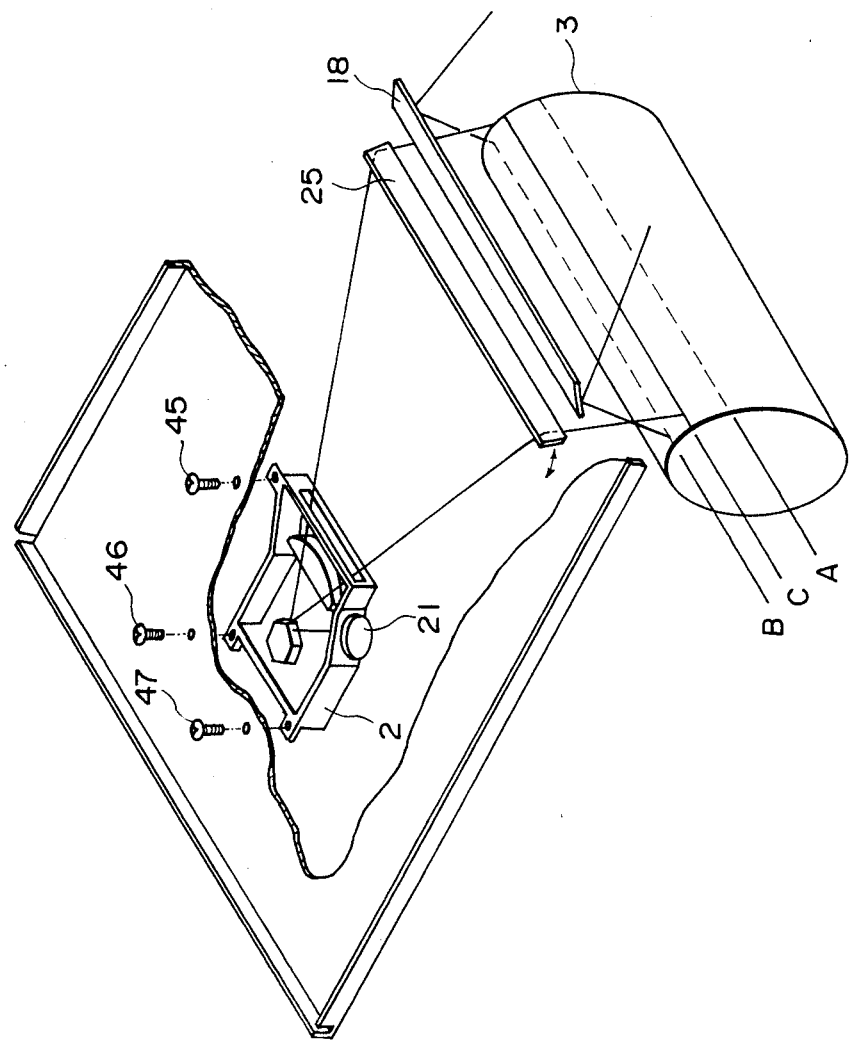
FIG. 3 is an exploded perspective view illustrating the mounting of the laser scanner unit in the FIG. 1 embodiment.

As shown in FIG. 3, the laser scanner unit 2 is mounted to the bottom surface of the supporting plate 4 by fixing screws 45, 46 and 47 and are suspended therefrom. In this embodiment, a mirror 25 for introducing a laser beam to the photosensitive drum 3 is suspended from the bottom surface of the supporting plate 4. Therefore, when the positional adjustment is carried out for the laser scanner unit 2, the optical path B of the first optical system is made parallel with respect to the generating line A of the photosensitive drum 3, and the main scanning direction C of the laser scanner unit 2 is made parallel with respect to the generating line A, by adjusting the position of the mirror 25.

As described, in the embodiment of the present invention, the lens unit having the imaging lens influential to the state of imaging of the original onto the photosensitive member, and the laser scanner unit are fixedly secured onto the same supporting plate, and therefore, the positional accuracy of the beam in the first optical system and the beam in the second optical system are high.

In this embodiment, the mirror unit is also fixed on the supporting plate 4, and therefore, the accuracy in the positional relation between the first and second optical systems 1 and 2 is high. Accordingly, it is easy to align the main scanning directions in the respective optical systems with the generating line direction of the photosensitive drum 3. Also, since the laser scanner unit 2 is mounted to the bottom surface of the supporting plate 4, the necessity for a cover for dust-proof is eliminated, the structure can be simplified without giving up the disturbance to the image by the dust or the like. Additionally, since both of the first and second optical systems 1 and 2 are fixedly mounted on the same mounting plate, the size and weight of the apparatus can be reduced.

Figure 5:
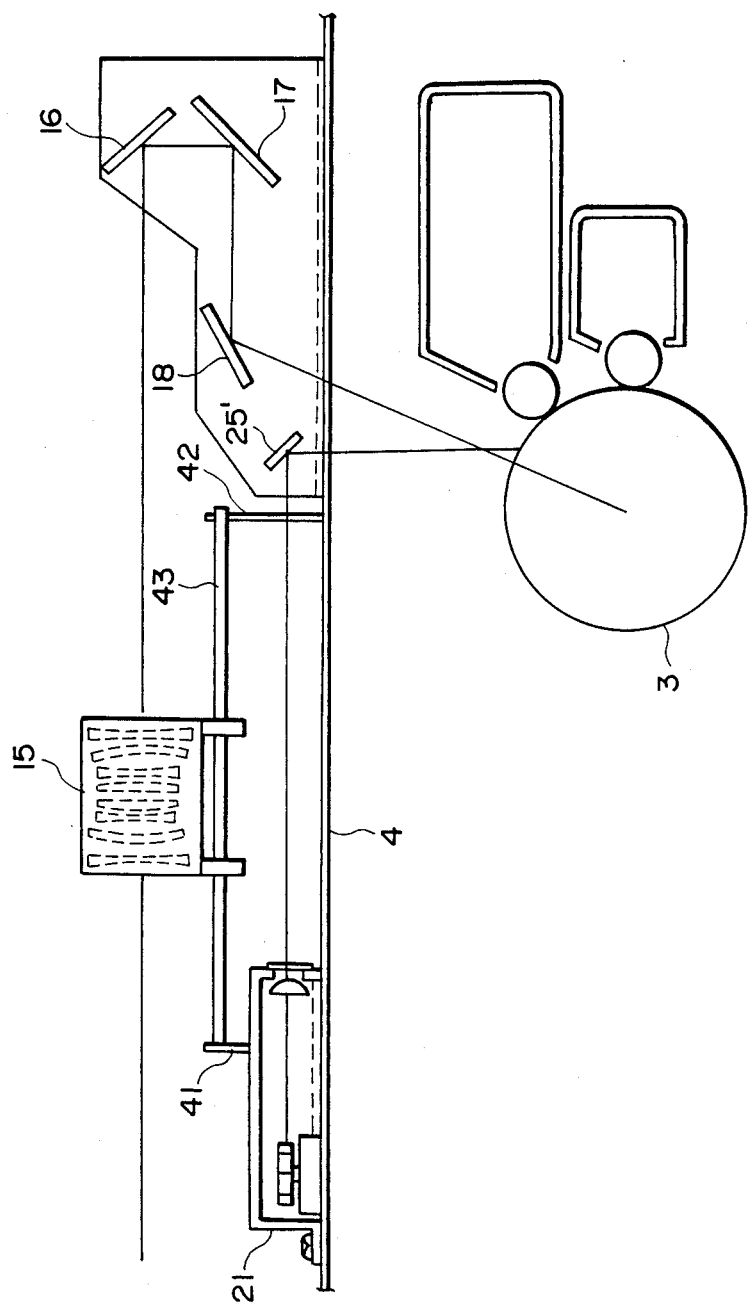
FIG. 5 is a sectional view of a major part of an image forming apparatus according to another embodiment of the present invention.
Figure 6:
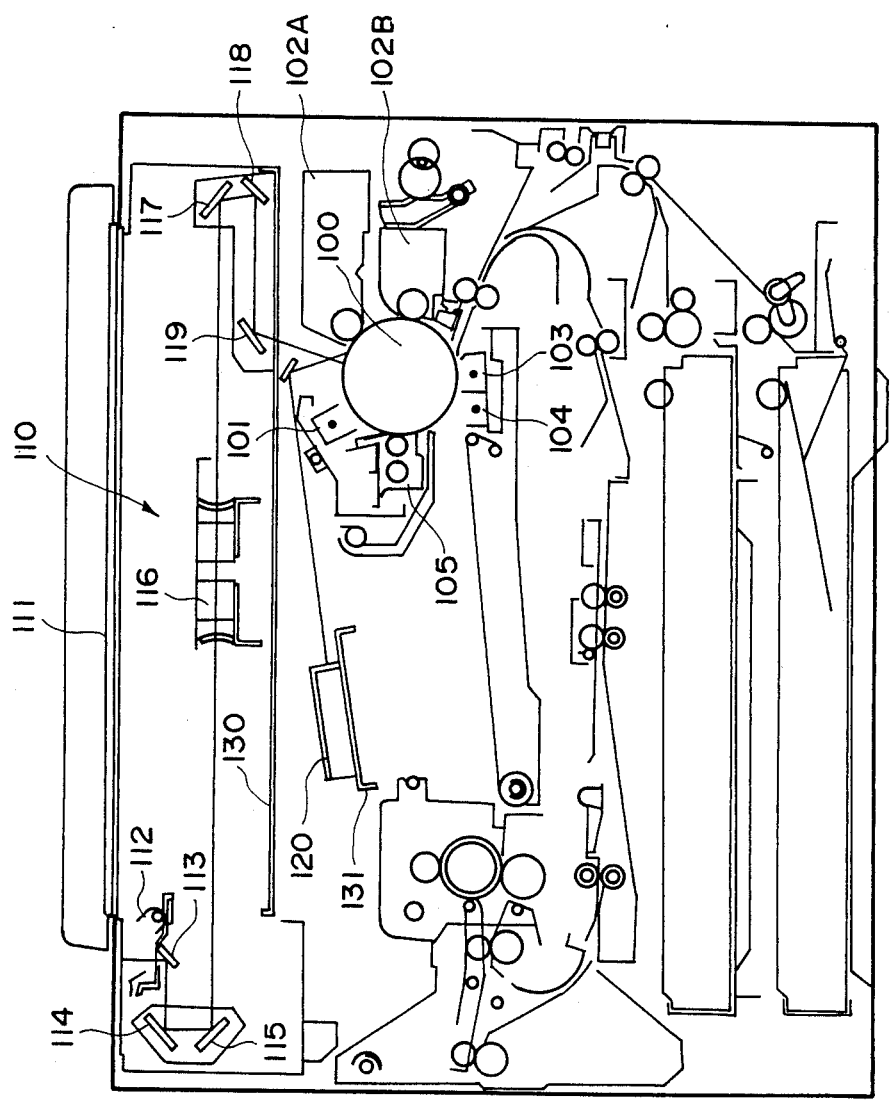
FIG. 6 is a sectional view of an image forming apparatus which does not use the present invention.

FIG. 5 is a sectional view of an image forming apparatus according to another embodiment. In this Figure, the same reference numerals are assigned to the elements having the corresponding functions, and the detailed description is omitted. In this embodiment, unlike the above-described embodiment, the second optical system 2' is fixed on the same supporting surface as the lens unit of the first optical system 1. According to this embodiment, the lens unit and the laser scanner unit are supported on the same surface of the supporting plate 4, and therefore, the positional accuracy is further improved.

Although the foregoing description has been made with respect to the case where the two optical systems are provided, the present embodiment is applicable to the case where three or more optical systems are provided.

While the invention has been described with reference to the structures disclosed herein, it is not confined to the details set forth and this application is intended to cover such modifications or changes as may come within the purposes of the improvements or the scope of the following claims.

What is claimed is:

1. An apparatus, comprising:
a photosensitive member;
first optical means for illuminating an original and exposing said photosensitive member to light from the original, said first optical means including a lens unit having a lens for forming an image of the original on said photosensitive member; and
a second optical means for projecting light on said photosensitive member;
wherein said lens unit and said second optical means are fixed on the same base member, and wherein said lens unit is fixed on a top surface of said base member, and said second optical means is fixed on a bottom surface of said base member.

2. An apparatus, comprising:
a photosensitive member;

first optical means for illuminating an original and exposing said photosensitive member to light from the original, said first optical means including a lens unit having a lens for forming an image of the original on said photosensitive member; and a second optical means for projecting light on said photosensitive member, said second optical means including a laser source for emitting a laser beam and deflecting means for deflecting the laser beam emitted from the laser source;

wherein said lens unit and said second optical means are fixed on the same base member.

3. An apparatus according to claim 2, further comprising a mirror for directing the deflected laser beam to said photosensitive member and a supporting plate for supporting the mirror, wherein the supporting plate is also fixed to said base member.

4. An apparatus according to claim 1, wherein said lens is movable to change a magnification of the image formed on the photosensitive member from the original.

5. An apparatus according to claim 1, wherein said base member and an optical axis of said lens are extended parallel.

6. An apparatus according to claim 1, wherein said second optical unit is effective to dissipate unnecessary electric charge on said photosensitive member.

7. An apparatus according to claim 1, wherein said base member is made of a steel plate having a thickness of not less than 1.6 mm.

8. An apparatus according to claim 2, wherein said second optical unit includes a case for accommodating the laser source, the deflecting means, and wherein said base member constitutes a part of the case.

9. An apparatus according to claim 8, wherein said base member also functions as a top cover of said case.

10. An apparatus according to claim 2, wherein said lens is movable to change a magnification of the image formed on the photosensitive member from the original.

11. An apparatus according to claim 2, wherein said base member and an optical axis of said lens are extended parallel.

12. An apparatus according to claim 2, wherein said second optical unit is effective to dissipate unnecessary electric charge on said photosensitive member.

13. An apparatus according to claim 2, wherein said base member is made of a steel plate having a thickness of not less than 1.6 mm.

14. An image forming apparatus, comprising:

a photosensitive member;

first optical means for illuminating an original and exposing said photosensitive member to light from the original, said first optical means including a lens unit having a lens for forming an image of the original on said photosensitive member, wherein said first optical means includes illuminating means for illuminating the original;

second optical means for removing residual charge from said photosensitive member, said second optical means including exposure means different from said illuminating means;

wherein said lens unit and said second optical means are fixed on the same base member.

15. An apparatus according to claim 14, wherein said lens is movable to change a magnification of the image formed on the photosensitive member from the original.

16. An apparatus according to claim 14, wherein said base member and an optical axis of said lens are extended parallel.

17. An apparatus according to claim 14, wherein said base member is made of a steel plate having a thickness of not less than 1.6 mm.

18. An apparatus according to claim 14, wherein said second optical means exposes such a portion of said photosensitive member as corresponds to a recording material and a next recording material.

* * * * *